(12) United States Patent
Tsutsumi

(10) Patent No.: US 11,145,467 B2
(45) Date of Patent: Oct. 12, 2021

(54) SOLID ELECTROLYTIC CAPACITOR AND METHOD FOR MANUFACTURING SOLID ELECTROLYTIC CAPACITOR

(71) Applicant: Murata Manufacturing Co., Ltd., Nagaokakyo (JP)

(72) Inventor: Toshio Tsutsumi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 217 days.

(21) Appl. No.: 16/376,230

(22) Filed: Apr. 5, 2019

(65) Prior Publication Data
US 2019/0237266 A1  Aug. 1, 2019

Related U.S. Application Data

(63) Continuation of application No. PCT/JP2017/037332, filed on Oct. 16, 2017.

(30) Foreign Application Priority Data

Oct. 17, 2016 (JP) .............................. JP2016-203683

(51) Int. Cl.
*H01G 9/012* (2006.01)
*H01G 9/15* (2006.01)
(Continued)

(52) U.S. Cl.
CPC .......... *H01G 9/012* (2013.01); *H01G 9/0036* (2013.01); *H01G 9/028* (2013.01); *H01G 9/10* (2013.01); *H01G 9/15* (2013.01)

(58) Field of Classification Search
CPC ....................................................... H01G 9/15
See application file for complete search history.

(56) References Cited

U.S. PATENT DOCUMENTS

| 6,392,869 B2 | 5/2002 | Shiraishi et al. |
| 2002/0001169 A1 | 1/2002 | Shiraishi et al. |

(Continued)

FOREIGN PATENT DOCUMENTS

| CN | 1327246 A | 12/2001 |
| JP | H04119623 A | 4/1992 |

(Continued)

OTHER PUBLICATIONS

International Search Report issued for PCT/JP2017/037332, dated Jan. 8, 2018.

(Continued)

*Primary Examiner* — Eric W Thomas
(74) *Attorney, Agent, or Firm* — Arent Fox LLP

(57) ABSTRACT

A solid electrolytic capacitor that includes a capacitor device having a valve action metal substrate with a main surface, a first end surface orthogonal to the main surface and disposed in an electrode extended direction, a second end surface orthogonal to the main surface and opposite the first main surface, and a side surface orthogonal to the main surface and the first end surface, and a porous layer on the main surface, a dielectric layer on at least part of a surface of the porous layer, a solid electrolyte layer on the dielectric layer, an electric conductor layer on the solid electrolyte layer, and an insulating material directly covering one of the first and second end surfaces of the valve action metal substrate.

16 Claims, 6 Drawing Sheets

(51) Int. Cl.
*H01G 9/028* (2006.01)
*H01G 9/00* (2006.01)
*H01G 9/10* (2006.01)

(56) References Cited

U.S. PATENT DOCUMENTS

2004/0130857 A1* 7/2004 Miki .................... H01G 9/042
　　　　　　　　　　　　　　　　　　　　　　361/523
2007/0030629 A1　2/2007 Asami et al.
2015/0357122 A1　12/2015 Matsubara et al.

FOREIGN PATENT DOCUMENTS

| JP | H04276612 A | 10/1992 |
| JP | 2007042932 A | 2/2007 |
| JP | 2008166315 A | 7/2008 |
| JP | 2008186481 A | 8/2008 |
| JP | 2008186841 A | 8/2008 |
| JP | 2008186842 A | 8/2008 |
| JP | 2015230976 A | 12/2015 |

OTHER PUBLICATIONS

Written Opinion of the International Searching Authority issued for PCT/JP2017/037332, dated Jan. 8, 2018.

\* cited by examiner

CROSS-SECTIONAL VIEW TAKEN ALONG LINE A-A

CROSS-SECTIONAL VIEW TAKEN ALONG LINE B-B

CROSS-SECTIONAL VIEW TAKEN ALONG LINE B-B

SOLID ELECTROLYTIC CAPACITOR AND METHOD FOR MANUFACTURING SOLID ELECTROLYTIC CAPACITOR

CROSS REFERENCE TO RELATED APPLICATIONS

The present application is a continuation of International application No. PCT/JP2017/037332, filed Oct. 16, 2017, which claims priority to Japanese Patent Application No. 2016-203683, filed Oct. 17, 2016, the entire contents of each of which are incorporated herein by reference.

FIELD OF THE INVENTION

The present invention relates to a solid electrolytic capacitor and a method for manufacturing the solid electrolytic capacitor.

BACKGROUND OF THE INVENTION

Patent Document 1 describes a solid electrolytic capacitor that includes a capacitor device, which includes an anode portion, a dielectric layer disposed on the anode portion, and a cathode portion disposed on the dielectric layer, and an anode lead-out terminal electrically coupled to the anode portion of the capacitor device, and a method for manufacturing the solid electrolytic capacitor.

Patent Document 1 states that in order to place a polymer film serving as a solid electrolyte over "a portion at which a cathode portion is to be formed" where pores in a porous layer of a capacitor device are filled with a solid electrolyte, a PEDOT/PSS dispersion liquid is applied to a surface of the portion at which a cathode portion is to be formed and is dried to form a polymer layer (solid electrolyte layer).

Patent Document 1: Japanese Unexamined Patent Application Publication No. 2015-230976

SUMMARY OF THE INVENTION

When a printing technique of applying a dispersion liquid as described in Patent Document 1 is employed, insufficient dissemination of the dispersion liquid often occurs on a side surface on the cathode portion side or an end surface on the cathode portion side of a capacitor device. A portion with insufficient dissemination of dispersion liquid may form a defective portion in a solid electrolyte layer, and the defective portion has an increased incidence of LC defects (a defective mode with an increased leakage current).

To solve these problems, the present invention aims to provide a solid electrolytic capacitor with fewer LC defects and a method for manufacturing the solid electrolytic capacitor.

A solid electrolytic capacitor according to the present invention includes a capacitor device, which includes a valve action metal substrate that includes a main surface, a first end surface orthogonal to the main surface and disposed in an electrode extended direction, a second end surface orthogonal to the main surface and opposite the first main surface, and a side surface orthogonal to the main surface and the first end surface, and a porous layer on the main surface, a dielectric layer on at least part of a surface of the porous layer, a solid electrolyte layer on the dielectric layer, an electric conductor layer on the solid electrolyte layer, and an insulating material directly covering one of the first and second end surfaces of the valve action metal substrate.

A solid electrolytic capacitor according to the present invention preferably includes an insulating mask portion made of an insulating material disposed on the valve action metal substrate to insulate a cathode-portion-forming portion, which is a portion at which a cathode portion is to be formed, from an anode electrode portion, which is a portion that is to become an anode portion, on the valve action metal substrate, and wherein at least one of a side surface and a first or second end surface of the cathode-portion-forming portion is directly covered with the insulating material.

In a solid electrolytic capacitor according to the present invention, the side surface and the first end surface of the cathode-portion-forming portion are preferably entirely directly covered with the insulating material.

In a solid electrolytic capacitor according to the present invention, preferably, the periphery of a principal surface of the cathode-portion-forming portion is entirely covered with the insulating material, and the solid electrolyte layer and the electric conductor layer are disposed in a region surrounded by the insulating material on the principal surface.

In a solid electrolytic capacitor according to the present invention, preferably, the periphery of a principal surface of the cathode-portion-forming portion is partly covered with the insulating material, and the solid electrolyte layer and the electric conductor layer are disposed in a region surrounded by the insulating material on the principal surface.

A solid electrolytic capacitor according to the present invention preferably further includes a metal foil electrically connected to the electric conductor layer, wherein the metal foil is disposed on the insulating material entirely or partly covering the electric conductor layer and the periphery of the principal surface of the cathode-portion-forming portion.

In a solid electrolytic capacitor according to the present invention, the insulating material of the insulating mask portion preferably has a different composition from the insulating material directly covering the first or second end surface of the cathode-portion-forming portion.

In a solid electrolytic capacitor according to the present invention, preferably, the capacitor device is sealed with an exterior resin, and the insulating material and the exterior resin have different compositions.

In a solid electrolytic capacitor according to the present invention, the valve action metal substrate preferably has no dielectric layer on its side surface.

In a solid electrolytic capacitor according to the present invention, the valve action metal substrate is preferably made of aluminum.

In a solid electrolytic capacitor according to the present invention, a plurality of the capacitor devices are preferably laminated together.

A method for manufacturing a solid electrolytic capacitor according to the present invention includes preparing a metal core portion that has a porous layer on its surface and a dielectric layer on a surface of the porous layer, cutting the metal core portion into a valve action metal substrate having a main surface, a first end surface orthogonal to the main surface and disposed in an electrode extended direction, a second end surface orthogonal to the main surface and opposite the first end surface, and a side surface orthogonal to the main surface and the first end surface and to expose the metal core portion at the first end surface, directly covering a part of the exposed portion of the metal core portion at the first end surface of the valve action metal substrate with an insulating material after the cutting, forming a solid electrolyte layer on the dielectric layer, and forming an electric conductor layer on the solid electrolyte layer.

In a method for manufacturing a solid electrolytic capacitor according to the present invention, the solid electrolyte layer is preferably formed by performing sponge transfer of a liquid containing an electrically conductive polymer or an electrically conductive monomer onto the dielectric layer on the main surface of the valve action metal substrate.

An electrically conductive monomer in the present specification refers to a monomer that can be polymerized to form an electrically conductive polymer.

In a method for manufacturing a solid electrolytic capacitor according to the present invention, the solid electrolyte layer is preferably formed by immersing the valve action metal substrate in a liquid containing an electrically conductive polymer or an electrically conductive monomer.

In a method for manufacturing a solid electrolytic capacitor according to the present invention, the electric conductor layer is preferably formed by applying a material for forming the electric conductor layer to the solid electrolyte layer by printing.

In a method for manufacturing a solid electrolytic capacitor according to the present invention, the electric conductor layer is preferably formed by immersing the valve action metal substrate including the solid electrolyte layer in a liquid containing a material for forming the electric conductor layer.

In a method for manufacturing a solid electrolytic capacitor according to the present invention, preferably, the insulating material is applied by screen printing to a periphery of a principal surface of a cathode-portion-forming portion of the valve action metal substrate so as to directly cover the side surface and the first end surface of the valve action metal substrate with the insulating material, a metal foil is electrically connected to the electric conductor layer and on the insulating material covering the electric conductor layer along the periphery of the principal surface of the cathode-portion-forming portion.

In a method for manufacturing a solid electrolytic capacitor according to the present invention, the insulating material is preferably applied by screen printing to a periphery of a principal surface of a cathode-portion-forming portion of the valve action metal substrate so as to directly cover the side surface and the first end surface of the valve action metal substrate with the insulating material, and placing a second insulating material on the valve action metal substrate to insulate the cathode-portion-forming portion from an anode electrode portion of the valve action metal substrate.

In a solid electrolytic capacitor according to the present invention, one end surface of the valve action metal substrate is directly covered with an insulating material. Covering this portion with a mask material can reduce the occurrence of LC defects due to insufficient go-around of dispersion liquid.

DETAILED DESCRIPTION OF THE PREFERRED EMBODIMENTS

Figure 1A:
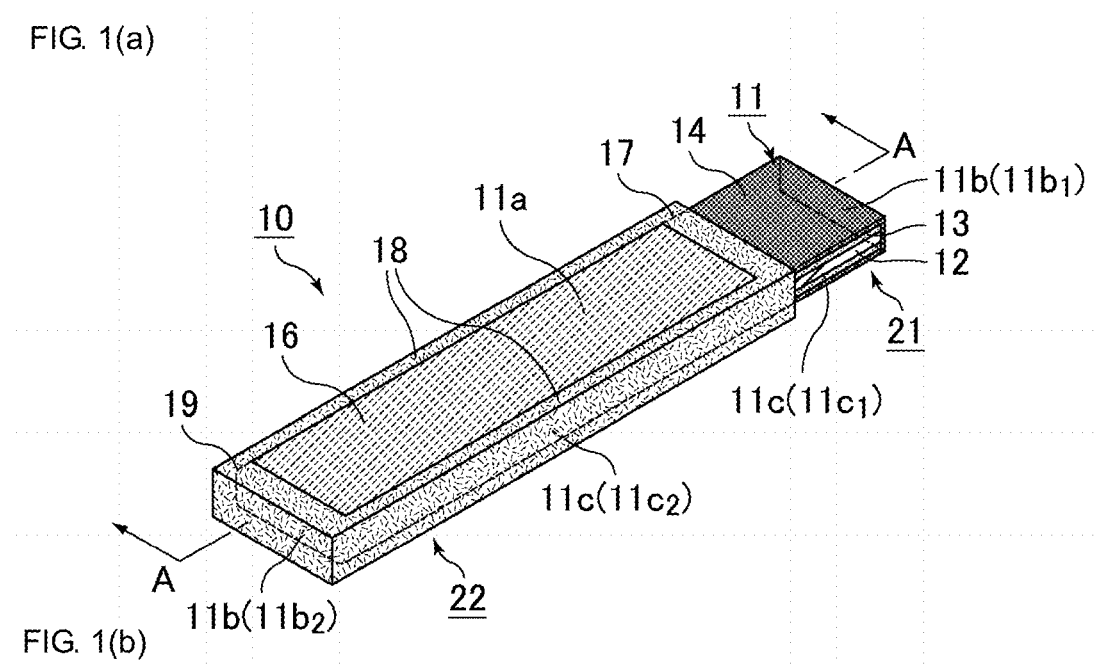
FIG. 1($a$) is a schematic perspective view of a capacitor device constituting a solid electrolytic capacitor according to the present invention, and FIG. 1($b$) is a cross-sectional view taken along the line A-A of FIG. 1($a$).

A solid electrolytic capacitor according to the present invention will be described below.

The present invention is not limited to the following embodiments, and various modifications may be made in them without departing from the gist of the present invention. A combination of two or more of preferred embodiments of the present invention described below also falls within the scope of the present invention.

[Solid Electrolytic Capacitor]

A solid electrolytic capacitor according to the present invention includes a capacitor device, which includes a valve action metal substrate that includes a main surface, a first end surface orthogonal to the main surface and disposed in an electrode extended direction, a second end surface orthogonal to the main surface and opposite the first end surface, and a side surface orthogonal to the main surface and the first end surface, and a porous layer on the main surface, a dielectric layer on at least part of a surface of the porous layer, a solid electrolyte layer on the dielectric layer, an electric conductor layer on the solid electrolyte layer, and an insulating material directly covering one of the first and second end surfaces of the valve action metal substrate.

First, a capacitor device of a solid electrolytic capacitor according to the present invention will be described below.

A capacitor device constituting a solid electrolytic capacitor according to the present invention includes a valve action metal substrate having a porous layer on its main surface, a dielectric layer formed on at least part of a surface of the porous layer, a solid electrolyte layer disposed on the dielectric layer, and an electric conductor layer disposed on the solid electrolyte layer.

FIG. 1($a$) is a schematic perspective view of a capacitor device constituting a solid electrolytic capacitor according to the present invention, and FIG. 1($b$) is a cross-sectional view taken along the line A-A of FIG. 1($a$).

FIG. 1($a$) illustrates an insulating mask portion 17 made of a mask material disposed on a valve action metal substrate 11 constituting a capacitor device 10. The insulating mask portion 17 insulates and isolates an anode portion 21 from a cathode portion 22.

The valve action metal substrate 11 includes a main surface 11$a$, an end surface 11$b$ orthogonal to the main surface 11$a$ and disposed in an electrode extended direction, and a side surface 11$c$ orthogonal to the main surface 11$a$ and the end surface 11$b$.

The end surface $11b$ is divided into an anode-portion-side end surface $11b_1$, which is an end surface on the anode side and serves as an electrode extended portion, and a cathode-portion-side end surface $11b_2$, which is an end surface on the cathode portion side. The direction from the anode-portion-side end surface $11b_1$ to the cathode-portion-side end surface $11b_2$ or its opposite direction is the electrode extended direction.

The side surface $11c$ is also divided by the insulating mask portion 17 described later into an anode-portion-side side surface $11c_1$, which is disposed on the anode portion side, and a cathode-portion-side side surface $11c_2$, which is disposed on the cathode portion side.

The cathode-portion-side side surface $11c_2$ of the valve action metal substrate 11 is directly covered with a side surface mask portion 18 made of a mask material, and the cathode-portion-side end surface $11b_2$ of the valve action metal substrate 11 is also directly covered with an end surface mask portion 19.

The mask materials constituting the insulating mask portion 17, the side surface mask portion 18, and the end surface mask portion 19 are insulating materials.

Thus, in the capacitor device 10 illustrated in FIG. 1(a), the cathode-portion-side side surface $11c_2$ and the cathode-portion-side end surface $11b_2$ of the valve action metal substrate 11 are entirely directly covered with the mask materials.

The mask materials include a first mask material, which is a mask material that covers one end surface of the valve action metal substrate and may directly cover the side surface of the valve action metal substrate, and a second mask material, which is a mask material disposed on the valve action metal substrate to insulate a cathode-portion-forming portion, which is a portion at which a cathode portion is to be formed, from an anode electrode portion, which is a portion that is to become an anode portion, on the valve action metal substrate.

The mask material constituting the side surface mask portion 18 and the end surface mask portion 19 is the first mask material, and the mask material constituting the insulating mask portion 17 is the second mask material.

The first mask material and the second mask material are insulating materials and may be the same material or different materials.

The anode-portion-side side surface $11c_1$ and the anode-portion-side end surface $11b_1$ of the valve action metal substrate 11 are not covered with any mask material, and a dielectric layer 14 is disposed on the main surface $11a$ of the valve action metal substrate 11.

No dielectric layer may be disposed on the side surface of the valve action metal substrate. FIG. 1(a) shows that no dielectric layer is disposed on the anode-portion-side side surface $11c_1$ of the valve action metal substrate 11, and a metal core portion 12 is exposed. No dielectric layer may also be disposed on the cathode-portion-side side surface $11c_2$ of the valve action metal substrate 11 directly covered with the side surface mask portion 18.

The above structure is preferred because it can be produced without cut-end chemical conversion treatment of the side surface of the valve action metal substrate.

The terms "cathode-portion-side side surface" and "cathode-portion-side end surface" of the valve action metal substrate refer to parts of the side surface and the end surface of the valve action metal substrate disposed on the cathode portion side of the insulating mask portion. The terms "anode-portion-side side surface" and "anode-portion-side end surface" of the valve action metal substrate refer to parts of the side surface and the end surface of the valve action metal substrate disposed on the anode portion side of the insulating mask portion.

FIG. 1(a) illustrates an electric conductor layer 16 disposed in a region surrounded by the mask materials on the main surface of the valve action metal substrate 11. A solid electrolyte layer 15, which is disposed under the electric conductor layer 16, is also disposed in the region surrounded by the mask materials on the main surface of the valve action metal substrate 11.

The layers of the capacitor device 10 will be described below with reference to FIG. 1(b).

Figure 1B:
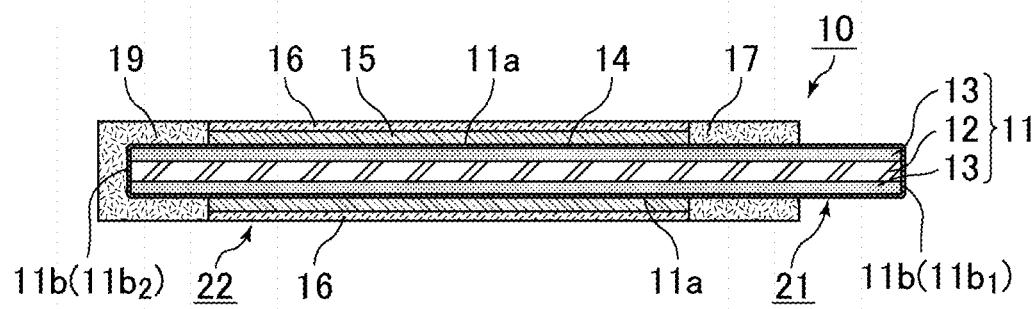

FIG. 1(b) clearly shows that the cathode-portion-side end surface $11b_2$ of the valve action metal substrate 11 is directly covered with the end surface mask portion 19. In the cathode-portion-side end surface $11b_2$ of the valve action metal substrate 11, the end surface mask portion 19 directly covers part of the main surface on the front and back sides of the valve action metal substrate 11 and thereby prevents the solid electrolyte layer 15 from being disposed around the cathode-portion-side end surface $11b_2$ of the valve action metal substrate 11.

Although not shown in the cross-sectional view of FIG. 1(b), also in the side surface of the valve action metal substrate 11, the side surface mask portion 18 directly covers part of the main surface on the front and back sides of the valve action metal substrate 11 and thereby prevents the solid electrolyte layer 15 from being disposed around the cathode-portion-side side surface $11c_2$ of the valve action metal substrate 11.

In a solid electrolytic capacitor including a capacitor device with such a structure, LC defects (a defective mode with an increased leakage current) can be reduced.

The valve action metal substrate is electrically isolated by the insulating mask portion into the cathode portion and the anode portion. In the valve action metal substrate before the insulating mask portion is formed, the portion at which the cathode portion is to be formed is referred to as a cathode-portion-forming portion, and the portion that is to become the anode portion is referred to as an anode electrode portion. At least one of the side surface and the end surface of the cathode-portion-forming portion is preferably directly covered with a mask material.

Directly covering at least one of the side surface and the end surface of the cathode-portion-forming portion with a mask material can reduce the occurrence of LC defects due to faults in this portion.

The side surface and the end surface of the cathode-portion-forming portion are preferably entirely directly covered with a mask material. This structure on the whole can reduce the occurrence of LC defects due to faults in the side surface and the end surface of the cathode portion.

Preferably, the periphery of the principal surface of the cathode-portion-forming portion is entirely covered with a mask material, and the solid electrolyte layer and the electric conductor layer are formed in a region surrounded by a mask material on the principal surface.

Such a structure can definitely prevent the solid electrolyte layer and the electric conductor layer from being disposed around the side surface and the end surface of the cathode portion and can further reduce the occurrence of LC defects.

In a solid electrolytic capacitor according to the present invention, the valve action metal substrate is made of a valve action metal, which has what is called a valve action. Examples of the valve action metal include metal elements, such as aluminum, tantalum, niobium, titanium, zirconium, magnesium, and silicon, and alloys containing these metals. Among these, the valve action metal substrate is preferably made of aluminum or an aluminum alloy, more preferably aluminum.

A valve action metal substrate made of aluminum has low ESR and can provide a high-capacitance capacitor. Furthermore, a valve action metal substrate made of aluminum can also provide a capacitor having no DC bias and having good temperature change characteristics.

The valve action metal substrate may have any shape and is preferably flat, more preferably foil-like. The porous layer formed on the main surface of the valve action metal substrate is preferably an etched layer.

In a solid electrolytic capacitor according to the present invention, the dielectric layer is preferably a film of an oxide of the valve action metal. For example, when an aluminum foil is used as the valve action metal substrate, an oxide film serving as a dielectric layer can be formed by anodic oxidization in an aqueous solution containing boric acid, phosphoric acid, adipic acid, or a sodium or ammonium salt thereof.

No dielectric layer may be formed in the region covered with mask materials (the cathode-portion-side side surface and the cathode-portion-side end surface).

In a solid electrolytic capacitor according to the present invention, a material constituting the solid electrolyte layer is an electrically conductive polymer with a pyrrole, thiophene, or aniline skeleton, for example. The electrically conductive polymer with a thiophene skeleton is poly(3,4-ethylenedioxythiophene) (PEDOT), for example, and may be a complex with a dopant poly(styrene sulfonate) (PSS), PEDOT:PSS.

In a solid electrolytic capacitor according to the present invention, the mask material for use in the insulating mask portion, the side surface mask portion, or the end surface mask portion is an insulating material. Examples of the insulating material include insulating resins, such as polyphenylsulfone (PPS) resins, polyethersulfone (PES) resins, cyanate ester resins, fluoropolymers (such as tetrafluoroethylene and tetrafluoroethylene-perfluoroalkyl vinyl ether copolymers), compositions composed of a soluble polyimide siloxane and an epoxy resin, polyimide resins, polyamideimide resins, and derivatives and precursors thereof.

In a solid electrolytic capacitor according to the present invention, the mask material of the insulating mask portion (the second mask material) preferably has a different composition from the mask material directly covering the side surface and the end surface of the cathode-portion-forming portion, that is, the mask material of the side surface mask portion and the end surface mask portion (the first mask material).

If the mask material of the side surface mask portion has a different composition from the mask material of the end surface mask portion, when the mask material of the side surface mask portion or the end surface mask portion has a different composition from the mask material of the insulating mask portion, the mask material of the insulating mask portion has a different composition from the mask material of the side surface mask portion and the end surface mask portion.

The mask materials of the insulating mask portion, the side surface mask portion, and the end surface mask portion may have the same composition.

The mask materials preferably have a thickness of 5 µm or more and 20 µm or less.

The electric conductor layer is preferably composed of an underlying carbon layer and a silver layer disposed on the carbon layer and may be a carbon layer alone or a silver layer alone.

The electric conductor layer may be electrically connected to a metal foil.

Figure 2:
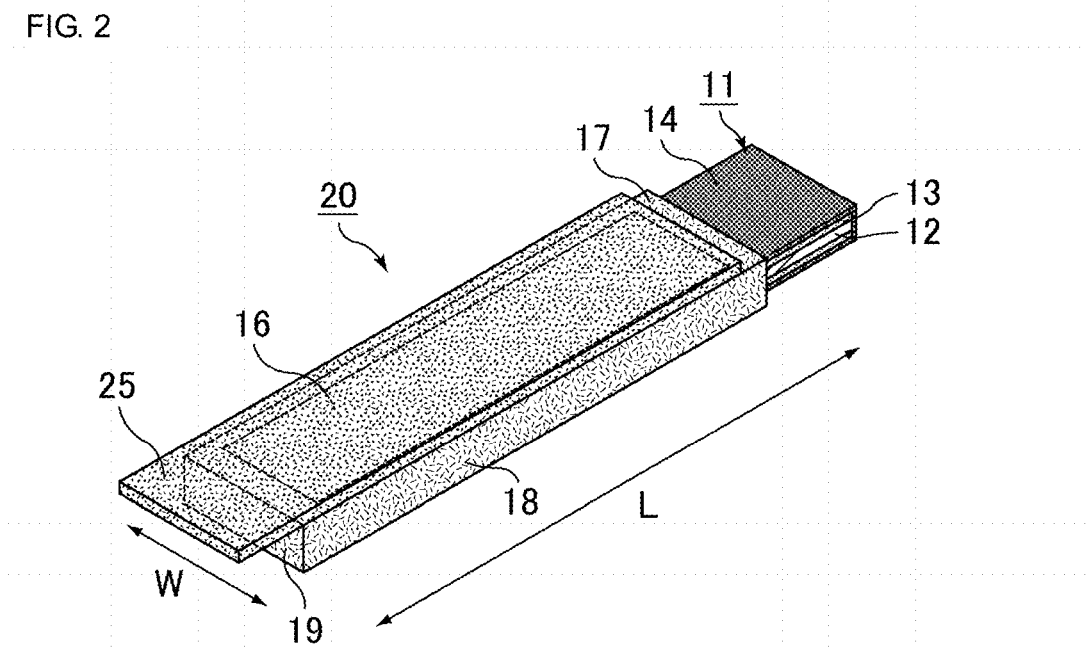
FIG. 2 is a schematic perspective view of a capacitor device including a metal foil.

The metal foil is also preferably disposed on an insulating material (mask material) entirely or partly covering the electric conductor layer and the periphery of the principal surface of the cathode-portion-forming portion. FIG. 2 illustrates an embodiment in which a metal foil is disposed on an insulating material (mask material) entirely covering the electric conductor layer and the periphery of the principal surface of the cathode-portion-forming portion.

The metal foil may be bonded to the mask material.

FIG. 2 is a schematic perspective view of a capacitor device including a metal foil.

In a capacitor device 20 with a metal foil, a metal foil 25 is disposed on the electric conductor layer 16 and is electrically connected to the electric conductor layer 16.

The metal foil 25 protrudes outward from the end surface mask portion 19 in the longitudinal direction (the direction indicated by the double-pointed arrow L in FIG. 2), and the protrusion can be coupled to an outer electrode. The metal foil 25 preferably has an end surface flush with the near side of the insulating mask portion 17 (the boundary of the insulating mask portion on the cathode portion side) in the longitudinal direction.

The metal foil 25 preferably does not protrude from the side surface mask portion 18 in the width direction (the direction indicated by the double-pointed arrow W in FIG. 2) and has a side surface flush with the surface of the side surface mask portion 18.

Figure 3:
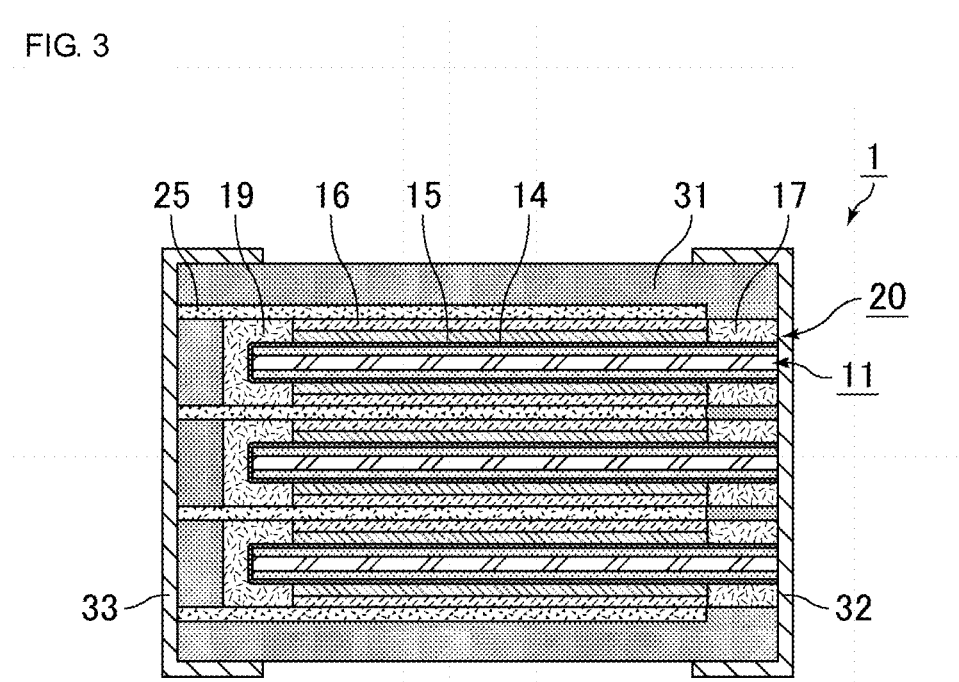
FIG. 3 is a schematic cross-sectional view of a solid electrolytic capacitor according to the present invention.

FIG. 3 is a schematic cross-sectional view of a solid electrolytic capacitor according to the present invention.

FIG. 3 schematically illustrates a solid electrolytic capacitor structure in which a plurality of the capacitor devices illustrated in FIG. 2 are laminated.

In a solid electrolytic capacitor 1 according to the present invention illustrated in FIG. 3, a plurality of capacitor devices 20 illustrated in FIG. 2 are laminated.

The capacitor devices 20 are enclosed in an exterior resin 31. The anode-portion-side end surface of the valve action metal substrate 11 is exposed at an end of the insulating mask portion 17 and is directly connected to an anode outer electrode 32 formed on one end surface of the solid electrolytic capacitor 1. An end portion of the metal foil 25 protrudes from the cathode-portion-side end surface of each capacitor device 20, is exposed at an end of the exterior resin 31, and is directly connected to a cathode outer electrode 33 formed on the surface of the exterior resin 31 (the other end surface of the solid electrolytic capacitor 1).

The metal foil 25 is also disposed on the lower side of the lowest capacitor device 20.

As in the solid electrolytic capacitor illustrated in FIG. 3, a metal foil electrically connected to an electric conductor layer can be directly connected to a cathode outer electrode to reduce ESR.

In a solid electrolytic capacitor according to the present invention, a plurality of capacitor devices are preferably laminated. A plurality of capacitor devices can be laminated to increase the capacitance of the capacitor.

The exterior resin material for sealing a capacitor device is an epoxy resin, for example. In a solid electrolytic capacitor according to the present invention, the mask materials preferably have a different composition from the exterior resin.

As a preferred combination, the mask materials are polyimide resins, and the exterior resin is an epoxy resin.

If the mask materials of the insulating mask portion, the side surface mask portion, and the end surface mask portion have different compositions, when any one of the mask materials has a different composition from the exterior resin, the mask materials are considered to have a different composition from the exterior resin.

The mask materials of the insulating mask portion, the side surface mask portion, and the end surface mask portion may have the same composition as the exterior resin.

Figure 4A:
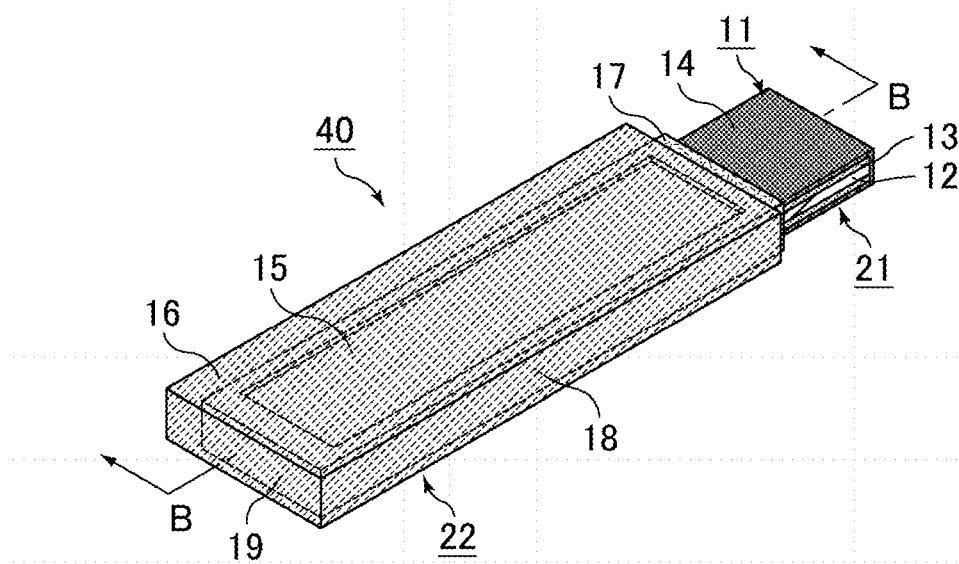
FIG. 4($a$) is a schematic perspective view of another capacitor device constituting a solid electrolytic capacitor according to the present invention, and FIG. 4($b$) is a cross-sectional view taken along the line B-B of FIG. 4($a$).
Figure 4B:
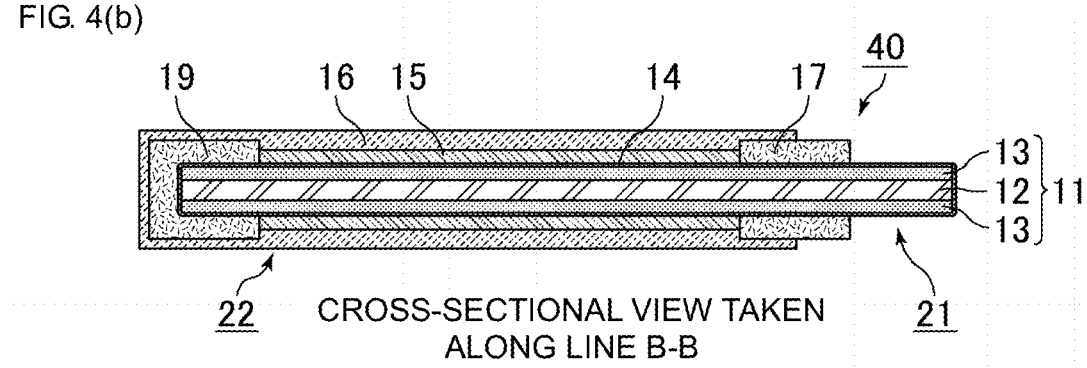

FIG. 4(a) is a schematic perspective view of another capacitor device constituting a solid electrolytic capacitor according to the present invention, and FIG. 4(b) is a cross-sectional view taken along the line B-B of FIG. 4(a).

In a capacitor device 40 illustrated in FIGS. 4(a) and 4(b), the region in which the electric conductor layer 16 is disposed is different from that in the capacitor device illustrated in FIGS. 1(a) and 1(b).

The electric conductor layer 16 is not only disposed on the solid electrolyte layer 15 but also entirely covers the side surface mask portion 18 and the end surface mask portion 19. The electric conductor layer 16 partly covers the surface of the insulating mask portion 17 but does not reach the anode portion 21 over the insulating mask portion 17.

As described later, the capacitor device 40 with this structure can be manufactured by immersing a valve action metal substrate including a solid electrolyte layer in a liquid containing a material for forming an electric conductor layer.

Figure 5:
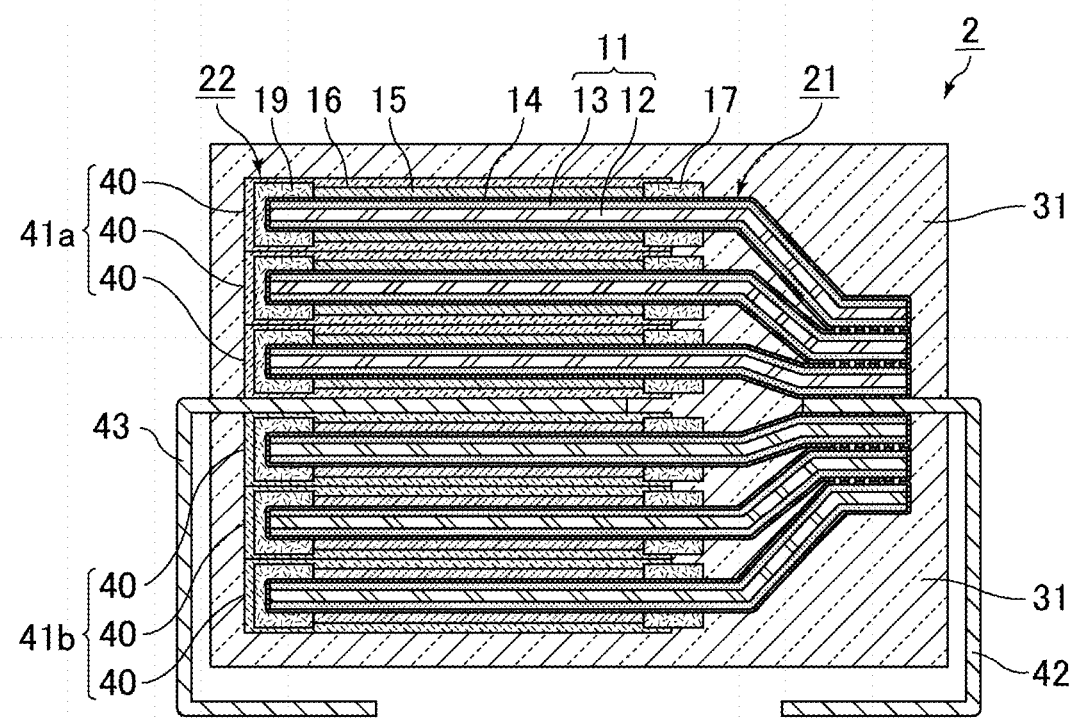
FIG. 5 is a schematic cross-sectional view of another solid electrolytic capacitor according to the present invention.

FIG. 5 is a schematic cross-sectional view of another solid electrolytic capacitor according to the present invention.

FIG. 5 schematically illustrates the structure of a solid electrolytic capacitor 2 in which a plurality of the capacitor devices 40 illustrated in FIGS. 4(a) and 4(b) are laminated.

The solid electrolytic capacitor 2 illustrated in FIG. 5 includes a plurality of the capacitor devices 40 and the exterior resin 31 and further includes an anode terminal 42 and a cathode terminal 43 as outer electrodes.

The exterior resin 31 entirely covers the capacitor device 40 and partly covers the anode terminal 42 and the cathode terminal 43.

As illustrated in FIG. 5, the capacitor devices 40 are laminated in a first capacitor device laminate 41a and a second capacitor device laminate 41b and are integrated with an electrically conductive paste (not shown), such as a silver paste, interposed between the cathode portions 22 of the capacitor devices 40. In the solid electrolytic capacitor 2 illustrated in FIG. 5, each of the first capacitor device laminate 41a and the second capacitor device laminate 41b is composed of three capacitor devices 40 laminated. A single capacitor device and a capacitor device laminate have the same effects in a solid electrolytic capacitor. Thus, the number of capacitor devices constituting a solid electrolytic capacitor according to the present invention is not particularly limited.

The anode terminal 42 is made of a metallic material and is formed as a leadframe on the anode portion 21 side. The anode portions 21 of the capacitor device 40 as well as the anode portions 21 and the anode terminal 42 of the capacitor device 40 are integrated, for example, by welding, such as resistance welding, or pressure bonding. As illustrated in FIG. 5, when the dielectric layer 14 is also formed on each surface of the anode portions 21 of the capacitor device 40, the anode portions 21 of the capacitor device 40 as well as the anode portions 21 and the anode terminal 42 of the capacitor device 40 can be integrated by heat generated by welding. To schematically illustrate this in FIG. 5, the corresponding portions of the dielectric layers 14 are indicated by broken lines.

The cathode terminal 43 is made of a metallic material and is formed as a leadframe on the cathode portion 22 side. The cathode portion 22 and the cathode terminal 43 of the capacitor device 40 are integrated, for example, with an electrically conductive paste (not shown), such as a silver paste.

In a solid electrolytic capacitor according to the present invention, the outer electrode is not limited to the leadframe and may be of any form.

FIGS. 3 and 5 illustrate the solid electrolytic capacitors in which the electrodes are extended from the capacitor devices by different methods in the cathode portion and the anode portion. FIGS. 1(a) and 1(b), FIG. 2, and FIGS. 4(a) and 4(b) illustrate the capacitor devices.

Any of the capacitor devices may be used in any of the solid electrolytic capacitors. The constituents of the capacitor devices and the solid electrolytic capacitors may be combined or substituted.

For example, a metal foil may be placed on the electric conductor layer of the capacitor device illustrated in FIGS. 4(a) and 4(b) such that the metal foil protrudes from the end surface mask portion as in the capacitor device illustrated in FIG. 2, and such a capacitor device may be used in the solid electrolytic capacitor illustrated in FIG. 3.

[Method for Manufacturing Solid Electrolytic Capacitor]

A method for manufacturing a solid electrolytic capacitor according to the present invention includes preparing a metal core portion that has a porous layer on its surface and a dielectric layer on a surface of the porous layer, cutting the metal core portion into a valve action metal substrate having a main surface, a first end surface orthogonal to the main surface and disposed in an electrode extended direction, a second end surface orthogonal to the main surface and opposite the first end surface, and a side surface orthogonal to the main surface and the first end surface and to expose the metal core portion at the first end surface, directly covering an exposed portion of the metal core portion at the first end surface with an insulating material after the cutting, forming a solid electrolyte layer on the dielectric layer, and forming an electric conductor layer on the solid electrolyte layer.

In this method, the valve action metal substrate is cut to a predetermined size, and an exposed portion of the metal core portion at one end surface of the valve action metal substrate after the cutting is directly covered with a mask material. In a typical process of manufacturing a solid electrolytic capacitor, an exposed portion of a metal core portion of a valve action metal substrate after cutting requires cut-end chemical conversion treatment to convert the surface of the exposed portion to an insulating layer. The cut-end chemical conversion treatment is preferably eliminated.

In a method for manufacturing a solid electrolytic capacitor according to the present invention, an exposed portion of the metal core portion of the valve action metal substrate is directly covered with the mask material to insulate the surface of the exposed portion, thereby obviating the need for cut-end chemical conversion treatment. Thus, a solid electrolytic capacitor can be manufactured by a simple process.

A solid electrolytic capacitor according to the present invention is preferably manufactured as described below.

FIGS. 6(a), 6(b), 6(c), and 6(d) are schematic perspective views of steps of a method for manufacturing a solid electrolytic capacitor.

First, a method of forming a solid electrolyte layer by sponge transfer and forming an electric conductor layer by printing is described below.

First, the valve action metal substrate 11 is prepared that includes the metal core portion 12 at the center thereof and a porous layer 13, such as an etched layer, on the main surface of the metal core portion 12. The valve action metal substrate 11 is described above. The valve action metal substrate 11 includes an anode electrode portion, which is a portion that is to become an anode portion, a cathode-portion-forming portion, which is a portion at which a cathode portion is to be formed, and an insulating-layer-forming portion, which is a portion at which an insulating mask portion that isolates the anode portion from the cathode portion is to be formed.

Next, the dielectric layer 14 formed of an oxide film is formed on at least the surface of the porous layer on the surface of the cathode-portion-forming portion of the valve action metal substrate 11. The oxide film is formed on the surface of the porous layer by anodic oxidation (also referred to as chemical conversion treatment) of the surface of the valve action metal substrate 11.

A chemically converted foil previously subjected to chemical conversion treatment is also preferably used as a valve action metal substrate with a dielectric layer formed on the surface of a porous layer.

A valve action metal substrate that has a porous layer on its main surface and a dielectric layer on the surface of the porous layer can be prepared in this step.

The valve action metal substrate 11 is then cut to a predetermined size.

In this cutting step, the main surface of the valve action metal substrate, an end surface orthogonal to the main surface and disposed in an electrode extended direction, and a side surface orthogonal to the main surface and the end surface are formed. The metal core portion 12 is exposed at the section of the valve action metal substrate 11, that is, at an end surface of the valve action metal substrate. Furthermore, the metal core portion is also exposed at a side surface of the valve action metal substrate.

Subsequently, a masking step is performed to directly cover the exposed portion of the metal core portion at one end surface of the valve action metal substrate with a mask material. In the masking step, the exposed portion of the metal core portion is directly covered with a mask material, and this ensures insulation of the section of the valve action metal substrate without cut-end chemical conversion.

In the masking step, the side surface and the end surface of the valve action metal substrate are preferably entirely directly covered with a mask material, and the surface of the insulating-layer-forming portion of the valve action metal substrate is preferably covered with a mask material to form an insulating mask portion that isolates the anode portion from the cathode portion.

In the masking step, a mask material composed of an insulating material, such as insulating resin, is applied to the surface of the valve action metal substrate and is solidified or hardened by heating or the like.

A mask material is preferably applied by screen printing and is allowed to go around the side surface and the end surface of the valve action metal substrate, thereby directly covering the side surface and the end surface of the valve action metal substrate. A mask material is preferably applied by screen printing to the front and back sides of the valve action metal substrate.

These portions can be directly covered with a mask material to entirely cover the periphery of the principal surface of the cathode-portion-forming portion with the mask material.

Figure 6A:
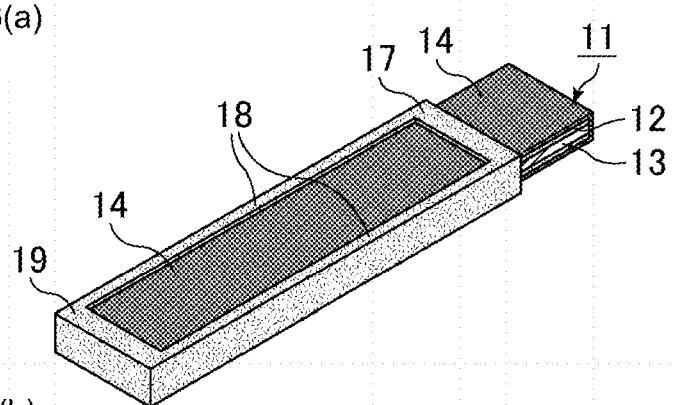
FIGS. 6($a$), 6($b$), 6($c$), and 6($d$) are schematic perspective views of steps of a method for manufacturing a solid electrolytic capacitor.

FIG. 6(a) schematically illustrates such a structure.

Figure 6B:
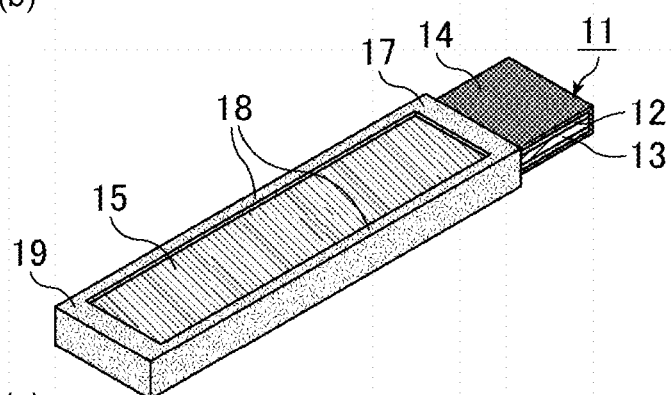

Subsequently, a solid electrolyte layer is formed on the dielectric layer on the principal surface of the cathode-portion-forming portion, the periphery of which is covered with a mask material. FIG. 6(b) shows that a liquid containing an electrically conductive polymer or an electrically conductive monomer is applied to the dielectric layer 14 by sponge transfer to form the solid electrolyte layer 15 in the region surrounded by mask materials (the insulating mask portion 17, the side surface mask portion 18, and the end surface mask portion 19).

When an electrically conductive monomer is used, a liquid containing the electrically conductive monomer can be applied to the dielectric layer, and the monomer can be chemically polymerized to form a solid electrolyte layer.

Subsequently, a material for forming an electric conductor layer is applied to the solid electrolyte layer by printing.

The material for forming an electric conductor layer may be a carbon paste and a silver paste. Preferably, a carbon paste layer is formed on the solid electrolyte layer, and a silver paste layer is formed on the carbon paste layer.

Figure 6C:
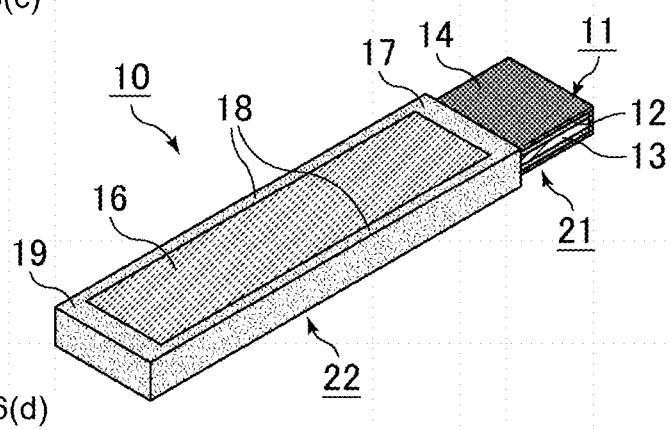

FIG. 6(c) shows that the electric conductor layer 16 is formed in the region surrounded by mask materials (the insulating mask portion 17, the side surface mask portion 18, and the end surface mask portion 19).

A portion of the valve action metal substrate 11 on the anode portion side is then cut at the boundary between the valve action metal substrate 11 and the insulating mask portion 17 to expose the metal core portion 12 at the anode-portion-side end surface.

Subsequently, the metal foil 25 is placed on the electric conductor layer 16.

When the metal foil is placed, the metal foil is preferably placed while the layer under the metal foil is viscos. The carbon paste layer before drying is viscos and is suitable to directly place the metal foil thereon.

Drying the carbon paste layer before the metal foil is placed makes it difficult to bond the metal foil to the carbon paste layer, and therefore an electrically conductive adhesive layer is preferably formed before the metal foil is placed.

When the metal foil is placed, the metal foil is preferably placed on an insulating material (mask material) covering the electric conductor layer and the periphery of the principal surface of the cathode-portion-forming portion.

Figure 6D:
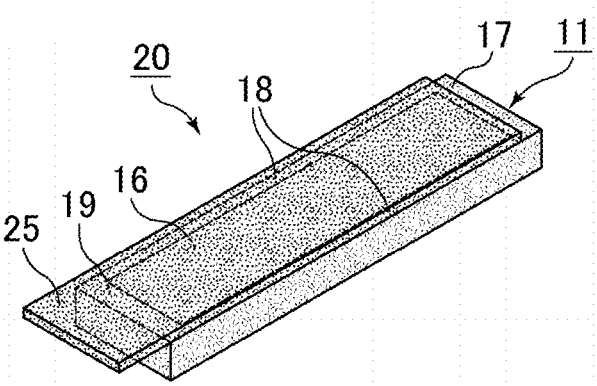

FIG. 6(d) illustrates the capacitor device 20 including the metal foil prepared in this step.

The solid electrolytic capacitor with the structure illustrated in FIG. 3 can be manufactured by laminating a plurality of capacitor devices illustrated in FIG. 6(d), sealing the capacitor devices with an exterior resin, exposing the metal foil at the cathode-portion-side end surface, exposing the valve action metal substrate at the anode-portion-side end surface, and forming a cathode outer electrode and an anode outer electrode.

When the capacitor devices are laminated, a plurality of constitutional units including the metal foil 25 on the electric conductor layer 16 as illustrated in FIG. 6(d) may be prepared and laminated. The metal foil is not necessarily placed on the electric conductor layer in advance and may be placed between the capacitor devices (between the electric conductor layers) when the capacitor devices are laminated.

Sealing with the exterior resin is performed to cover the periphery of the side surface of the multilayer body of the capacitor device. Sealing with the exterior resin can be performed, for example, by transfer molding.

In sealing with the exterior resin, the metal foil is exposed at the cathode-portion-side end surface even when the exterior resin is formed. The metal core portion of the valve action metal substrate is also exposed at the insulating mask portion at the anode-portion-side end surface.

After sealing, the metal core portion of the valve action metal substrate or the metal foil may be exposed by end surface grinding or the like.

The cathode outer electrode and the anode outer electrode can be formed by a plating method. The plating layer may be a Zn•Ni•Au layer, a Ni•Au layer, a Zn•Ni•Cu layer, or a Ni•Cu layer. Furthermore, a nickel plating layer, a tin plating layer, or a copper plating layer is preferably formed on these plating layers.

A solid electrolytic capacitor according to the present invention can also be manufactured as described below.

A method for forming a solid electrolyte layer and an electric conductor layer by an immersion method is described below.

This method is different from the method for manufacturing a solid electrolytic capacitor illustrated in FIGS. 6(a) to 6(d) with respect to a method for forming a solid electrolyte layer and an electric conductor layer.

Furthermore, this method is also different from the method for manufacturing a solid electrolytic capacitor illustrated in FIGS. 6(a) to 6(d) with respect to the use of no metal foil, no cutting of the valve action metal substrate on the anode portion side, and the use of a leadframe for connection with an outer electrode.

Figure 7A:
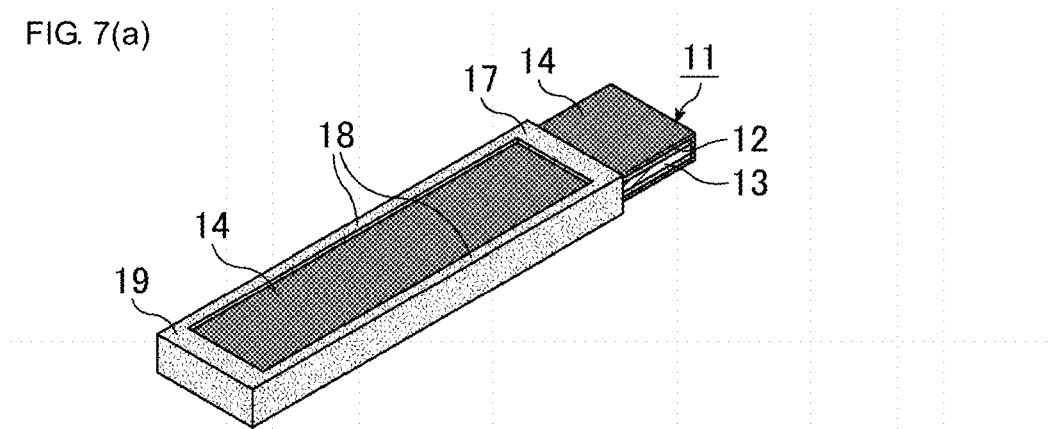
FIGS. 7($a$) and 7($b$) are schematic perspective views of steps of another method for manufacturing a solid electrolytic capacitor, and FIG. 7($c$) is a cross-sectional view taken along the line B-B of FIG. 7($b$).
Figure 7B:
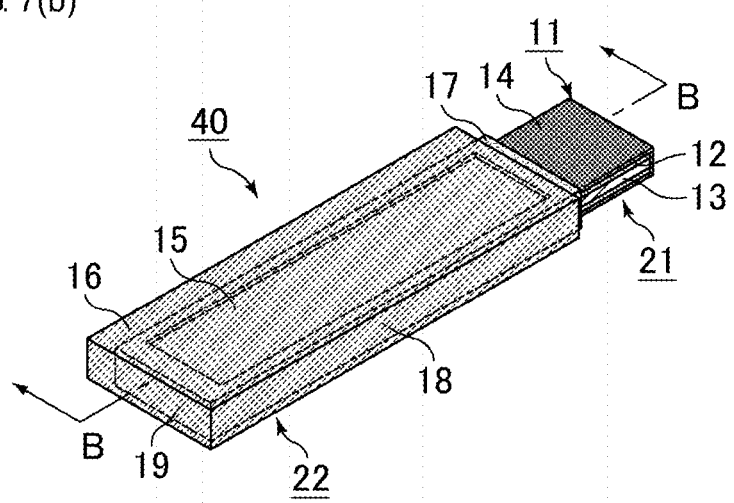
Figure 7C:
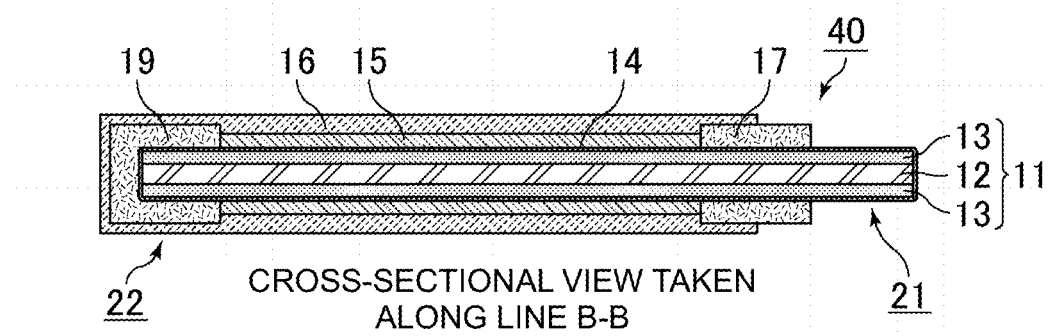

FIGS. 7(a) and 7(b) are schematic perspective views of the steps of another method for manufacturing a solid electrolytic capacitor. FIG. 7(c) is a cross-sectional view taken along the line B-B of FIG. 7(b).

FIG. 7(a) illustrates the structure after the valve action metal substrate is subjected to the masking step, which is the same as the structure illustrated in FIG. 6(a).

This valve action metal substrate is immersed in a liquid containing an electrically conductive polymer or an electrically conductive monomer to form a solid electrolyte layer. The portion from the cathode-portion-side end surface to the insulating mask portion is immersed, and the anode portion side of the insulating mask portion is not necessarily immersed.

The liquid containing an electrically conductive polymer or an electrically conductive monomer is repelled by the mask materials and does not adhere to the mask materials, only adhering to the dielectric layer. Thus, the solid electrolyte layer in the resulting structure is disposed in a region surrounded by the mask materials on the principal surface of the cathode-portion-forming portion.

When an electrically conductive monomer is used, a liquid containing the electrically conductive monomer can be applied to the dielectric layer, and the monomer can be chemically polymerized to form a solid electrolyte layer.

The valve action metal substrate on which the solid electrolyte layer is formed is then immersed in a carbon paste and a silver paste, which are materials for forming an electric conductor layer. The portion from the cathode-portion-side end surface to the insulating mask portion is immersed, and the anode portion side of the insulating mask portion is not necessarily immersed.

The valve action metal substrate is immersed in the carbon paste and then in the silver paste. The carbon paste layer may be dried before immersion in the silver paste.

The carbon paste and the silver paste are not repelled by the mask materials and remain on the mask materials. Thus, the portion immersed in the carbon paste and the silver paste is covered with the electric conductor layer, thus forming the structure illustrated in FIG. 7(b).

FIG. 7(c) is a cross-sectional view taken along the line B-B of FIG. 7(b). FIG. 7(c) shows that the solid electrolyte layer 15 does not remain on the mask materials, and the electric conductor layer 16 entirely covers the side surface mask portion 18 and the end surface mask portion 19 and partly covers the surface of the insulating mask portion 17.

The capacitor device illustrated in FIG. 7(b) can be used to manufacture the solid electrolytic capacitor illustrated in FIG. 5.

First, the capacitor devices are laminated. The capacitor devices are laminated with the anode portions of the capacitor devices facing each other. The anode portions are bonded together, and an anode terminal is bonded to the anode portions. The bonding method is welding or pressure bonding, for example.

Portions corresponding to the electric conductor layers are also brought into contact with each other and are laminated, and a cathode terminal is bonded to the electric conductor layer. Thus, the cathode portions are electrically connected to each other.

Subsequently, sealing with the exterior resin is performed to cover the entire capacitor device, part of the cathode terminal, and part of the anode terminal. The exterior resin is formed, for example, by transfer molding. Thus, the solid electrolytic capacitor is completed.

Although two methods for manufacturing a solid electrolytic capacitor are described above, the steps of the two methods may be appropriately combined or exchanged. For example, a metal foil may be placed on the electric conductor layer of the capacitor device illustrated in FIG. 7(b) such that the metal foil protrudes from the end surface mask portion as in the capacitor device illustrated in FIG. 2, and such a capacitor device may be used to constitute the solid electrolytic capacitor illustrated in FIG. 3.

Although sponge transfer and an immersion method are described above as methods for applying a liquid containing an electrically conductive polymer or an electrically conductive monomer to a dielectric layer, other methods may be used, for example, an electrostatic coating method, a spray coating method, a brushing method, a screen printing method, a gravure printing method, a spin coating method, a drop casting method, or an ink jet printing method.

EXAMPLES

Examples of a solid electrolytic capacitor according to the present invention are specifically disclosed below.

However, the present invention is not limited to these examples.

Example 1

First, a chemically converted aluminum foil having an etched layer on its surface was prepared as a valve action metal substrate. A dielectric layer formed of an oxide film was formed to cover the chemically converted aluminum foil.

More specifically, a voltage was applied to the surface of the chemically converted aluminum foil immersed in an aqueous ammonium adipate to form a dielectric layer on the etched layer on the surface of the chemically converted aluminum foil.

A mask material was then applied to both surfaces of the valve action metal substrate by screen printing to entirely directly cover the side surface and the end surface of the cathode-portion-forming portion of the valve action metal substrate with the mask material and to cover the surface of the insulating-layer-forming portion of the valve action metal substrate with the mask material, thereby forming an insulating mask portion that isolated the anode portion from the cathode portion. The mask material was polyimide.

An electrically conductive polymer mixed liquid, which was a liquid containing an electrically conductive polymer, was then applied by sponge transfer to the dielectric layer on the principal surface of the cathode-portion-forming portion, the periphery of which was covered with the mask material, thereby forming a solid electrolyte layer.

The electrically conductive polymer mixed liquid was a mixed liquid containing commercially available PEDOT: PSS (Orgacon HIL-1005 manufactured by Sigma-Aldrich). The electrically conductive polymer mixed liquid contained water as a dispersion medium and DMSO as a high-boiling solvent.

A carbon paste was applied to the surface of the solid electrolyte layer by screen printing and was dried to form a carbon layer. A silver paste was applied to the carbon layer by screen printing to form an electric conductor layer.

The resulting capacitor device, in which the mask material was disposed on four sides around the cathode-portion-forming portion of the valve action metal substrate, is hereinafter referred to as a capacitor device with a "four-side mask structure".

The capacitor devices with the four-side mask structure thus prepared were laminated with a metal foil interposed therebetween, thereby preparing a multilayer body. The metal foil was a copper foil.

The multilayer body was then sealed with an epoxy resin. An anode outer electrode coupled to the anode-portion-side end surface of the valve action metal substrate was then formed, and a cathode outer electrode coupled to the metal foil was then formed, thus completing a solid electrolytic capacitor.

The outer electrodes were formed by forming a zinc plating layer and a nickel plating layer and forming a copper plating layer, a nickel plating layer, and a tin plating layer on the zinc plating layer and the nickel plating layer.

Comparative Example 1

Figure 8:
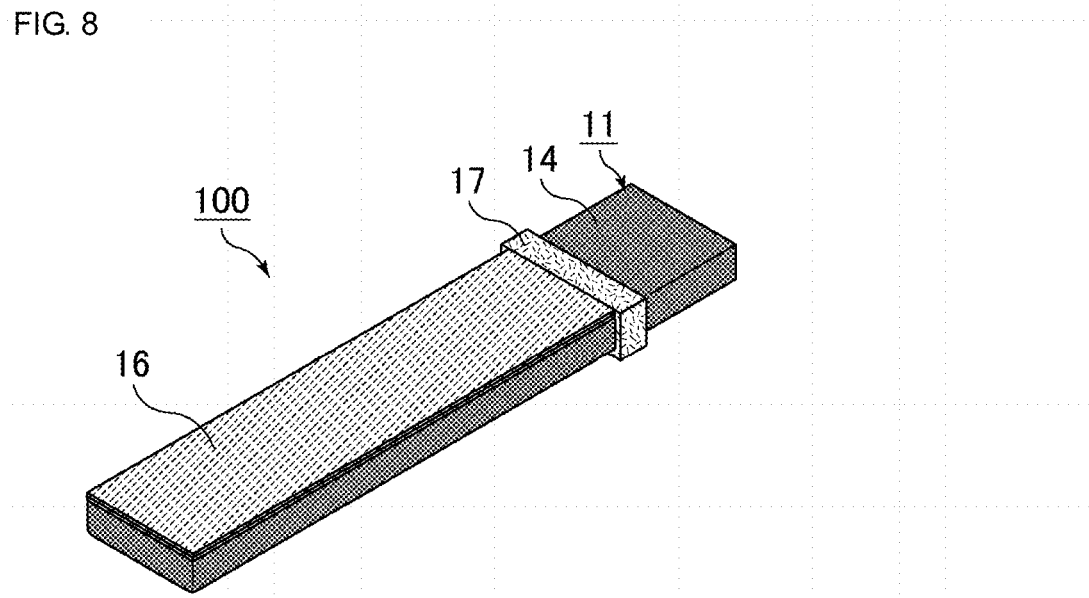
FIG. 8 is a schematic perspective view of a capacitor device with a single-side mask structure manufactured in Comparative Example 1.

FIG. 8 is a schematic perspective view of a capacitor device with a single-side mask structure manufactured in Comparative Example 1.

In Comparative Example 1, a mask material was applied only to a portion that was to become an insulating mask portion.

A portion at which a side surface and an end surface of the valve action metal substrate are sections was subjected to cut-end chemical conversion treatment to form a dielectric layer. Except for these, a capacitor device 100 that included the insulating mask portion 17 as the sole mask material as illustrated in FIG. 8 was manufactured in the same manner as in Example 1.

This capacitor device was used to manufacture a solid electrolytic capacitor in the same manner as in Example 1.

The resulting capacitor device, in which the mask material was disposed on only one side around the cathode-portion-forming portion of the valve action metal substrate, is hereinafter referred to as a capacitor device with a "single-side mask structure".

Figure 9:
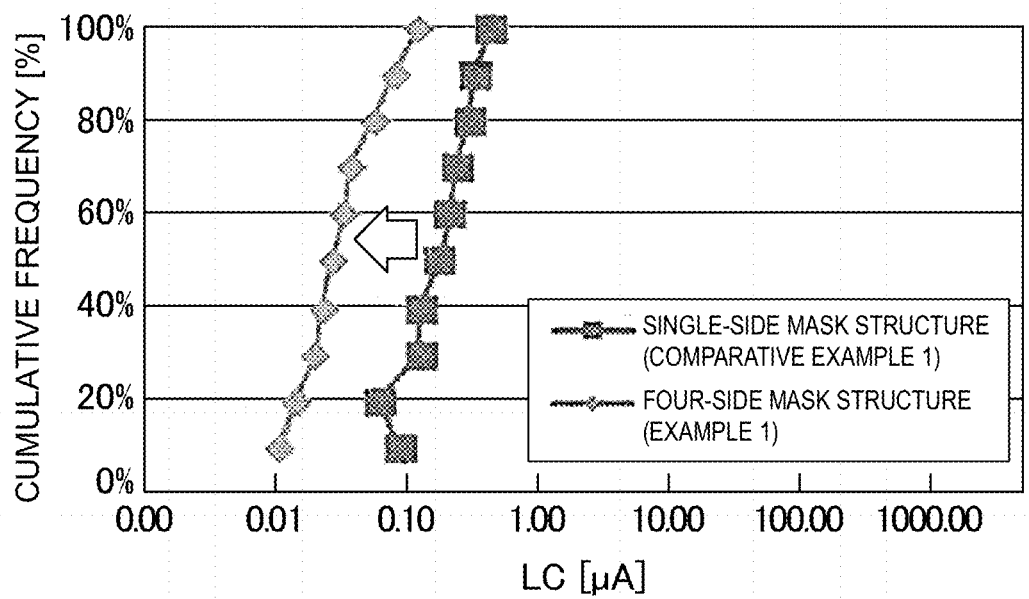
FIG. 9 is a graph showing leakage current measurements of solid electrolytic capacitors manufactured in Example 1 and Comparative Example 1.

The leakage current was measured in the solid electrolytic capacitor including the capacitor devices with the four-side mask structure manufactured in Example 1 and the solid electrolytic capacitor including the capacitor devices with the single-side mask structure manufactured in Comparative Example 1. FIG. 9 shows the results.

The leakage current was measured two minutes after voltage application.

In FIG. 9, the cumulative values of the leakage currents of ten solid electrolytic capacitors are plotted from the bottom to the top, and the LC value at the top (cumulative frequency 100%) is the total leakage current of the ten solid electrolytic capacitors.

These results show that the capacitor device with the four-side mask structure can be used to reduce LC defects.

REFERENCE SIGNS LIST 1, 2 solid electrolytic capacitor
10, 40 capacitor device
11 valve action metal substrate
11$a$ main surface of valve action metal substrate
11$b$ end surface of valve action metal substrate
11$b_1$ anode-portion-side end surface of valve action metal substrate
11$b_2$ cathode-portion-side end surface of valve action metal substrate
11$c_1$ anode-portion-side side surface of valve action metal substrate
11$c_2$ cathode-portion-side side surface of valve action metal substrate
12 metal core portion
13 porous layer
14 dielectric layer
15 solid electrolyte layer
16 electric conductor layer
17 insulating mask portion
18 side surface mask portion
19 end surface mask portion
20 capacitor device with metal foil
21 anode portion
22 cathode portion
25 metal foil
31 exterior resin
32 anode outer electrode
33 cathode outer electrode
41$a$ first capacitor device laminate
41$b$ second capacitor device laminate
42 anode terminal
43 cathode terminal
100 capacitor device with single-side mask structure

The invention claimed is:
1. A solid electrolytic capacitor comprising:
a capacitor device that includes:
a valve action metal substrate having a main surface, a first end surface orthogonal to the main surface and disposed in an electrode extended direction, a second end surface orthogonal to the main surface and opposite the first end surface, and a side surface orthogonal to the main surface and the first end surface, and a porous layer on the main surface;
a dielectric layer on at least part of a surface of the porous layer;
a solid electrolyte layer on the dielectric layer;

an electric conductor layer on the solid electrolyte layer;
a first insulating material directly covering one of the first end surface and the second end surface of the valve action metal substrate; and
a second insulating material on the valve action metal substrate between and isolating a cathode portion and an anode portion of the capacitor device,
wherein the solid electrolyte layer and the electric conductor layer are disposed in a region surrounded by the first and second insulating materials, and
wherein a periphery of a principal surface of the cathode portion is entirely covered with the first and second insulating materials.

2. The solid electrolytic capacitor according to claim 1, wherein the side surface and the first end surface of the cathode-portion-forming portion are entirely directly covered with the first insulating material.

3. The solid electrolytic capacitor according to claim 1, further comprising a metal foil electrically connected to the electric conductor layer.

4. The solid electrolytic capacitor according to claim 1, wherein the first insulating material has a different composition from the second insulating material.

5. The solid electrolytic capacitor according to claim 1, further comprising an exterior resin sealing the capacitor device, and the first insulating material and the exterior resin have different compositions.

6. The solid electrolytic capacitor according to claim 1, wherein the dielectric layer is not located on the side surface of the valve action metal substrate.

7. The solid electrolytic capacitor according to claim 1, wherein the valve action metal substrate is made of aluminum.

8. The solid electrolytic capacitor according to claim 1, wherein the solid electrolytic capacitor includes a plurality of the capacitor devices laminated together.

9. A solid electrolytic capacitor comprising:
a capacitor device that includes:
a valve action metal substrate having a main surface, a first end surface orthogonal to the main surface and disposed in an electrode extended direction, a second end surface orthogonal to the main surface and opposite the first end surface, and a side surface orthogonal to the main surface and the first end surface, and a porous layer on the main surface;
a dielectric layer on at least part of a surface of the porous layer;
a solid electrolyte layer on the dielectric layer;
an electric conductor layer on the solid electrolyte layer;
a first insulating material directly covering one of the first end surface and the second end surface of the valve action metal substrate; and
a second insulating material on the valve action metal substrate between and isolating a cathode portion and an anode portion of the capacitor device,
wherein the solid electrolyte layer and the electric conductor layer are disposed in a region surrounded by the first and second insulating materials, and
wherein a periphery of a principal surface of the cathode portion is partly covered with the first and second insulating materials.

10. The solid electrolytic capacitor according to claim 9, wherein the side surface and the first end surface of the cathode-portion-forming portion are entirely directly covered with the first insulating material.

11. The solid electrolytic capacitor according to claim 9, further comprising a metal foil electrically connected to the electric conductor layer.

12. The solid electrolytic capacitor according to claim 9, wherein the first insulating material has a different composition from the second insulating material.

13. The solid electrolytic capacitor according to claim 9, further comprising an exterior resin sealing the capacitor device, and the first insulating material and the exterior resin have different compositions.

14. The solid electrolytic capacitor according to claim 9, wherein the dielectric layer is not located on the side surface of the valve action metal substrate.

15. The solid electrolytic capacitor according to claim 9, wherein the valve action metal substrate is made of aluminum.

16. The solid electrolytic capacitor according to claim 9, wherein the solid electrolytic capacitor includes a plurality of the capacitor devices laminated together.

* * * * *